E. J. ARMBRUSTER.
AUTOMOBILE RAIN PROTECTOR.
APPLICATION FILED DEC. 16, 1912.

1,082,479.

Patented Dec. 23, 1913.

WITNESSES:
F. C. Matheny
E. Peterson

INVENTOR:
Edward J. Armbruster
BY
Pierre Barnes
ATTORNEY

UNITED STATES PATENT OFFICE.

EDWARD J. ARMBRUSTER, OF SEATTLE, WASHINGTON, ASSIGNOR OF ONE-THIRD TO IDA M. PORTER, OF SEATTLE, WASHINGTON.

AUTOMOBILE RAIN-PROTECTOR.

1,082,479.   Specification of Letters Patent.   Patented Dec. 23, 1913.

Application filed December 16, 1912. Serial No. 737,035.

*To all whom it may concern:*

Be it known that I, EDWARD J. ARMBRUSTER, a citizen of the United States, residing at Seattle, in the county of King and State of Washington, have invented certain new and useful Improvements in Automobile Rain-Protectors, of which the following is a specification.

This invention relates to automobiles; and its object is the provision of an awning or canopy which may be readily protruded laterally from the automobile top to protect a person from the rain when alighting.

The invention consists of the novel construction, arrangement and combination of parts, as will be hereinafter described and claimed.

Figure 1:
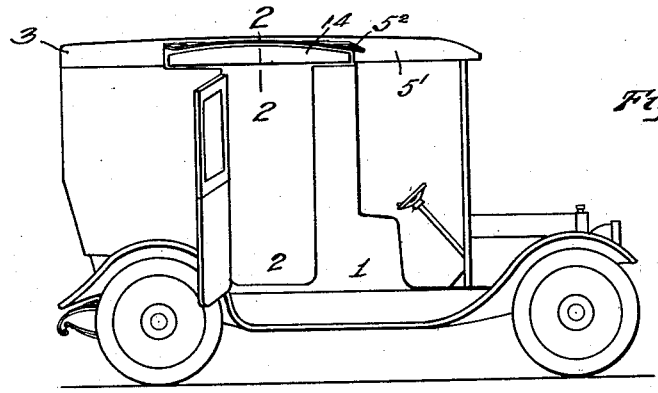
Figure 2:
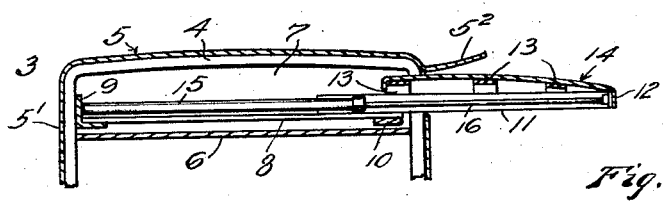
Figure 4:
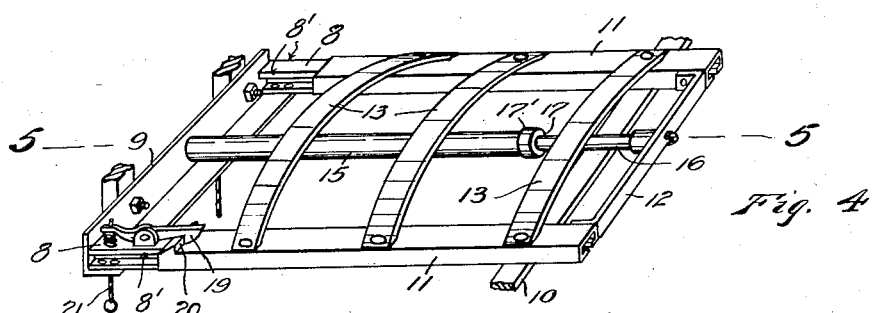
Figure 5:
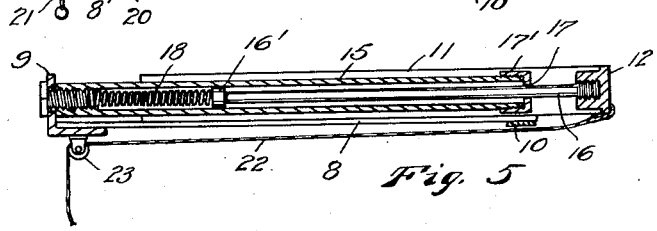
Figure 3:
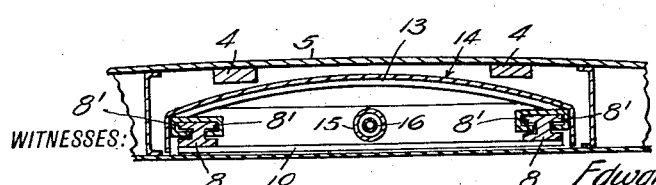

In the accompanying drawings, Figure 1 is a side elevation of an automobile with my invention applied thereto. Fig. 2 is a transverse vertical section taken through 2—2 of Fig. 1. Fig. 3 is a fragmentary longitudinal vertical section of Fig. 1. Fig. 4 is a perspective view illustrating the preferred construction of the awning frame-work, the manner of mounting the same, and the operating devices therefor. Fig. 5 is a detail sectional view through 5—5 of Fig. 4.

In the drawings, the reference numeral 1 designates the body of an automobile provided with a passageway 2 for the people to enter or leave the same. The top 3 of the automobile may be of any suitable type and, as illustrated, it is provided with roof frame-members 4 having a fabric covering 5 and a liner 6. The covering 5 is extended down at each side, as indicated by 5¹, and above the passageway 2 of the body, there is provided in the side 5¹ of the top an opening into the space 7 between the covering 5 and the liner 6. To close such opening the side of the cover is formed with a flap 5². Provided within space 7 are two parallel transversely arranged track rails 8 which, as shown in Fig. 4, are rigidly connected at their ends to longitudinal rails 9 and 10 which, in turn, are secured to the frame-members of the top. Said track rails are formed with flanges 8¹ along their upper edges which fit into T-shaped recesses provided within runner-bars 11. The latter are connected from their outer ends by a tie-bar 12 and intermediate the lengths of the runner-bars they are connected by spaced arcuate shaped bars 13. The various above named bars afford a skeleton frame for the awning covering 14 which is desirably of a fabric or other suitable material impervious to water.

Secured to the bar 9 and extending transversely with respect to the top is a tube 15 and extending thereinto is a rod 16 whose outer end is secured to the frame bar 12. The rod 16 is desirably of less diameter than the bore of said tube and makes a slidable fit through a reduced opening 17 provided in a cap 17¹ secured to the outer end of the tube. At its inner end the rod 16 has a head 16¹ slidable axially within the tube 15. Within the tube and acting against the rod head 16¹ is a helical spring 18. The outward movement of the awning is limited by the rod-head 16¹ encountering the cap 17¹ of the tube 15.

A hook-latch 19, or an equivalent, is provided to engage with a lug 20 provided on the awning frame for retaining the same within the space 7 of the top 3 in opposition to the power of the spring 18.

21 represents a cord extending through the top liner 6 whereby the operator within the vehicle may cause the latch to become disengaged from the awning frame, whereupon the spring 18 will exercise its power to push out the awning above the entrance to the automobile. A line 22 connected to the awning frame and passing over a sheave 23 into the inside of the vehicle is employed for returning the awning into the car top.

The operation of the invention will, it is thought, be understood from the foregoing description.

The invention is of simple construction, easy to operate and not liable to become deranged. By its use, a person dismounting from a car in rainy weather is protected by the awning while raising his umbrella and furnishes a much needed improvement to the automobile art.

What I claim, is—

1. The combination with a closed vehicle, of rails provided therein and arranged transversely of the top, an awning having a frame slidably mounted upon said rails, a spring acting to protrude said awning, and means carried by said rails to engage said awning frame for releasably securing said awning within said top and in opposition to said spring.

2. The combination with a closed vehicle, of an awning movable transversely thereof and adjacent the cover, a support for the awning, a spring acting to protrude the awning from the side of the cover, manually controlled means disposed within said vehicle to move the awning in a contrary direction, and releasable devices for securing the awning when brought by the said means within the top.

3. The combination with a closed vehicle having a side door opening, of an awning frame disposed adjacent the top thereof, relatively stationary supporting track rails therefor, a relatively stationary tube, a rod extending into the tube and connected to said awning frame, and a spring provided within the tube and acting against said rod for effecting the movement of said frame with respect to said rails.

4. The combination with a closed vehicle having a side door opening, of an awning frame disposed adjacent the top thereof, relatively stationary supporting track rails therefor, a relatively stationary tube, a rod extending into the tube and connected to said awning frame, a spring provided within said tube and acting against said rod for effecting the movement of said frame with respect to said rails, and means provided on the rod and coöperating with means provided on the tube for limiting such spring-effected movement of the frame.

Signed at Seattle, Wash., this 6th day of December, 1912.

EDWARD J. ARMBRUSTER.

Witnesses:
   PIERRE BARNES,
   E. PETERSON.